United States Patent [19]
Askwith et al.

[11] 3,878,791
[45] Apr. 22, 1975

[54] ENCAPSULATED PELLET IGNITER CHARGE

[75] Inventors: Herbert H. Askwith, Garden Grove; Owen J. Buckheim, Calimesa, both of Calif.; Orville O. Henderson, Everett, Wash.

[73] Assignee: The United States of America as represented by the Secretary of the United States Air Force, Washington, D.C.

[22] Filed: Jan. 17, 1969

[21] Appl. No.: 792,172

[52] U.S. Cl. .................. 102/101; 149/2; 149/20
[51] Int. Cl. ............................................. C06d 5/06
[58] Field of Search .......... 102/99, 101, 90, 87, 65, 102/66, 31, 27, 1; 149/2, 17, 18, 20

[56] References Cited
UNITED STATES PATENTS
| | | | |
|---|---|---|---|
| 3,129,561 | 4/1964 | Priapi | 102/101 X |
| 3,324,795 | 6/1967 | Miles | 102/102 |
| 3,493,142 | 2/1970 | Assmann | 102/67 UX |

*Primary Examiner*—Robert F. Stahl
*Attorney, Agent, or Firm*—Harry A. Herbert, Jr.; Jacob N. Erlich

[57] ABSTRACT

Encapsulating pellets by means of a molding operation in order to form a molded pellet mat capable of being used as an igniter charge to be inserted within the annular cavity of an igniter.

1 Claim, 6 Drawing Figures

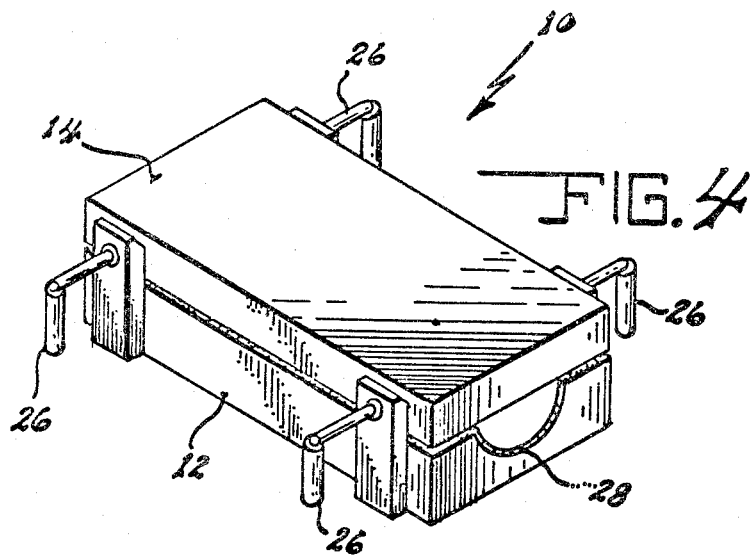
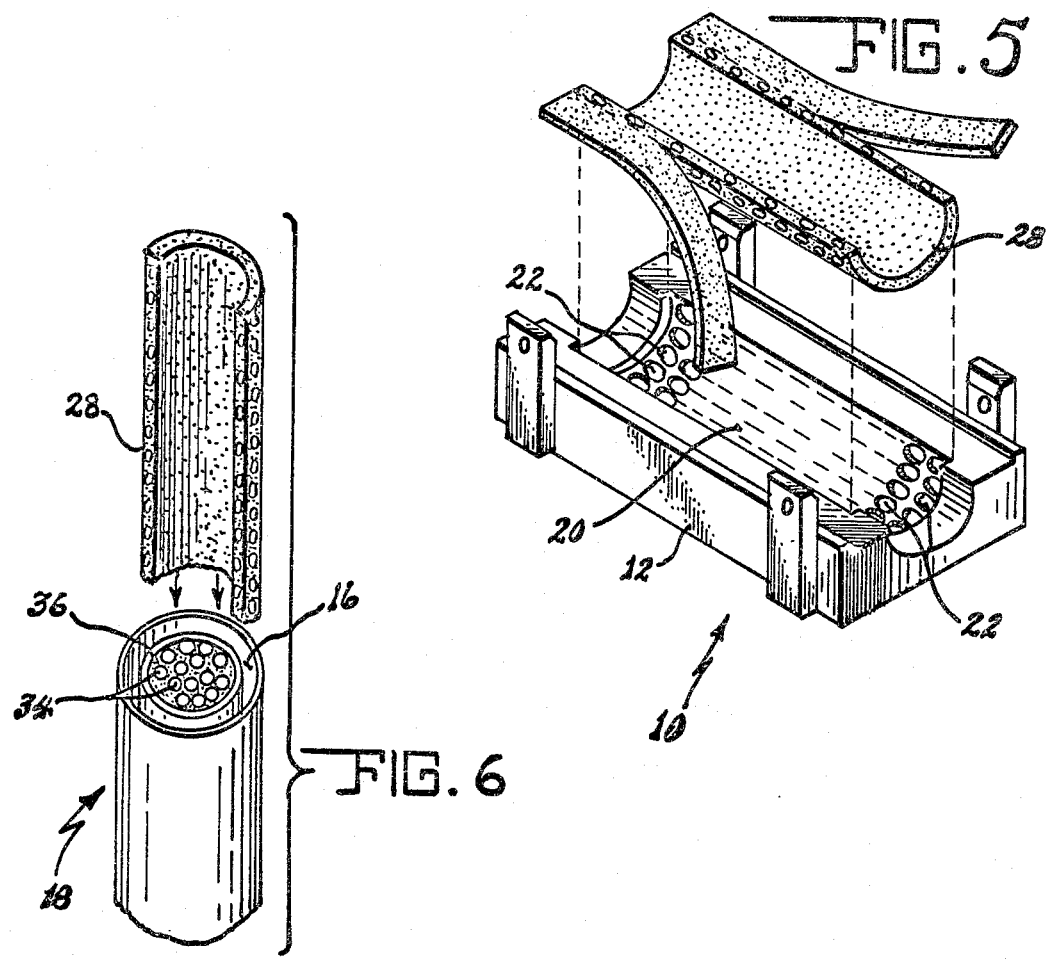

ENCAPSULATED PELLET IGNITER CHARGE

BACKGROUND OF THE INVENTION

This invention relates generally to igniters having an initial igniter charge within an inner chamber and having a main igniter charge in an annular igniter cavity surrounding said chamber, and more particularly to a method and apparatus for encapsulating pellets; these encapsulated pellets finding their main utility as an igniter charge to be inserted within said annular igniter cavity.

In rockets, missiles or winged aircraft the propellant whether liquid, gaseous or solid is ordinarily stored within a suitable chamber within the craft itself. The chamber may be supported in any suitable manner such as a spider arrangement. The present invention is not concerned with the nature of the propellant or of its support, but with the need for igniting such propellant by means of hot igniting gases.

It is important for suitable ignition that the igniting gases be projected at or to the propellant in a desired manner for a suitable igniting time of a few milliseconds. It is desirable for reliable ignition, without failure and without irregular and improper burning of the propellant, that the igniting gases be supplied in a constant fashion for a brief but perceptible igniting period. Of course, the pressure of the gases will change substantially during the igniting period, but it is desirable to avoid very high peak pressures which then trail off to much lower pressures early in the ignition period.

One excellent solution for the problem has been to provide a strong igniter housing for the igniter charge, with a plurality of nozzle openings directed toward the propellant, and adapted to project a number of jets of hot igniting gases from the igniter housing, across the intervening space within the rocket or missile housing, to the propellant. Such an igniter housing may be in the form of an ignition charge container mounted in the end of the rocket aircraft housing, and provided with an electrically controlled squib igniting means in its outer end, external to said housing.

The igniter housing is generally made of heavy enough material to withstand high peak pressures. The housing is generally of a cylindrical configuration having an inner chamber containing the initial igniter charge and an annular igniter cavity surrounding said inner chamber containing the main igniter charge.

A practical form for igniter material is in pellets rather than powder. These pellets are placed within the central chamber and the surrounding annular cavity of the igniter. It is of utmost importance that the main igniter charge located within said annular cavity be of superior quality for the most efficient operation of the igniter. However, some failures in the past have been traced to attrition of the pellets within the igniter cavity, during transport and storage prior to use. Furthermore, other problems have arisen with the use of pellet charges. For example, the depositing of these pellets within the limited space of said annular cavity has been extremely time consuming. Also, electrostatic discharge and auto ignition resulting from random static excitation of an igniter charge is a common occurrence.

SUMMARY OF THE INVENTION

The instant invention sets forth a method and apparatus for encapsulating pellets which overcomes all of the above-mentioned shortcomings. The pellets are encapsulated by a molding process which produces the molded pellet mat of the instant invention. The molded pellet mat of this invention has the same volume and configuration as the annular igniter cavity into which the pellets are normally placed individually by a manual operation. By the use of the encapsulated pellets of this invention in the form of a molded pellet mat produced by the molding process as set forth in detail hereinbelow, the pellets, held together by a foamed polyurethane filling, are installed in the annular cavity of the igniter in a prearranged pattern in one operation.

It is therefore an object of this invention to provide a method and apparatus for encapsulating pellet charges in the form of a molded pellet mat.

It is a further object of this invention to provide a molded pellet mat.

It is another object of this invention to provide encapsulated pellet charges in order to lessen the time of igniter assembly operation, and also to prevent attrition of the pellets during vibration thereof.

It is still a further object of this invention to provide a method and apparatus for encapsulating pellet charges which utilize components that lend themselves to standard mass producing techniques.

For a better understanding of the present invention, together with other and further objects thereof, reference is had to the following description taken in connection with the accompanying drawing and its scope will be pointed out in the appended claims.

DESCRIPTION OF THE DRAWING

FIG. 4 represents a perspective view of the male section in place over the female section of the mold during the molding process of this invention;

FIG. 5 represents an exploded perspective view of the encapsulated pellets of this invention in the form of a molded pellet mat being removed from the female section of the mold of this invention; and FIG. 6 represents an exploded perspective view of the encapsulated pellets of this invention in the form of an annular molded pellet mat about to be placed within the annular cavity of an igniter.

DESCRIPTION OF THE PREFERRED EMBODIMENT

Figure 1:
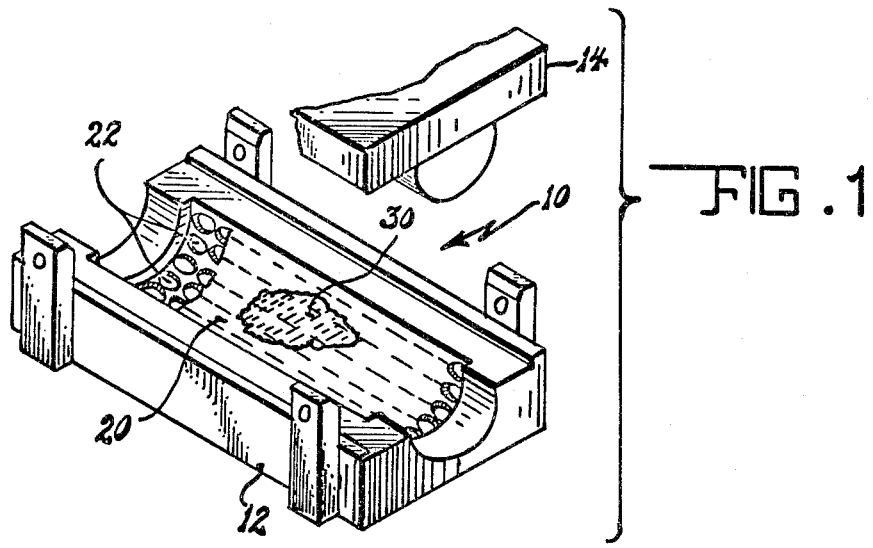
FIG. 1 represents an exploded perspective view of the male and female sections of the mold of this invention.

Reference is now made to FIG. 1 of the drawing in which numeral 10 designates the mold used for encapsulating the pellets. The mold 10 is made of any suitable material such as Teflon and comprises of two mating sections: a female half 12 corresponding to a diametric section through the longitudinal axis of a cylinder and a male half 14 of similar shape but having a smaller radius. The cylindrical configuration of the mold has the same configuration as the annular cavity 16 of a conventional igniter 18 (see FIG. 6). The inner surface 20 of the female section 12 of mold 10 has surface indentations 22 therein having a spherical curvature substantially equivalent to that of the crown of a pellet 24 (see FIG. 2), of pyrotechnic composition to be encapsulated and are positioned symmetrically on surface 20 in order to cover a maximum of mold surface. The mold sections 12 and 14 are aligned by dowel pins 26 made of any suitable material such as steel which are attached to the female section 12 (see FIG. 4).

All operations in the molding process of the instant invention prior to cure are made at a reduced ambient temperature. The encapsulated pellets in the form of a molded pellet mat 28 (see FIGS. 5 and 6) are made by brushing the inner surface 20 of female section 12 of the mold 10 with a parting agent or separating film 30 as shown in FIG. 1.

Figure 2:
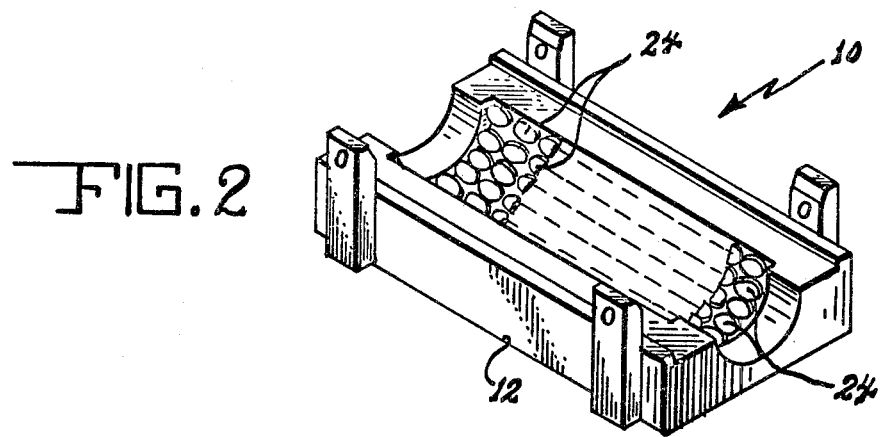
FIG. 2 represents a perspective view of the pellets within the female section of the mold of this invention.
Figure 3:
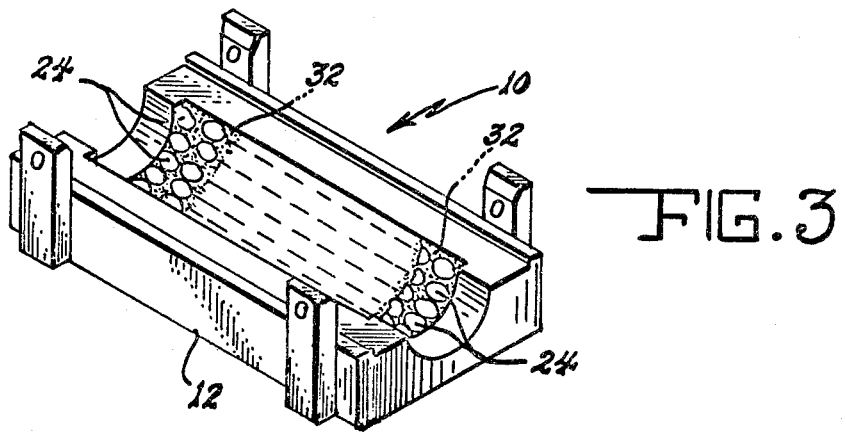
FIG. 3 represents a perspective view of the pellets and foam within the female section of the mold of this invention.

Referring now to FIG. 2 the pellets 24 are placed either manually or by machine in the spherical indentations 22 of the coated surface 20 of the female section 12 of mold 10. The pellets 24 are added until the required number are in place. A predetermined quantity of premixed foam 32 such as polyurethane as shown in FIG. 3 is evenly distributed between the rows of pellets 24 by any suitable applicating tool. The male section 14 is then fastened in place before the foaming action starts in the manner shown in FIG. 4 by securing dowels 26.

The assembly is allowed to cure for a minimum of 3 hours at 80°F ± 10°F. After curing, the mold 10 is opened and the encapsulated pellets in the form of molded pellet mat 28 are removed as seen in FIG. 5. The "flash" is trimmed from the pellet mat 28 by any suitable tool. Referring to FIG. 6 the pellet mat 28 is shown to have a cross section equivalent to half the cross section of the annular igniter cavity 16. Two such pellet mats 28 are required to fill the igniter cavity 16. The igniter cavity 16 is filled by sliding the molded pellet mat 28 into the annular igniter cavity of igniter 18. The initial igniter charge 34 may be filled by any conventional means or by a molded pellet mat of cross section similar to the cross section of chamber 36. Although the process of the instant invention as set forth above has been used primarily to encapsulate a pellet igniter charge, any other type of pellets may be similarly encapsulated.

MODE OF OPERATION

The encapsulated pellets or molded pellet mat 28 of the instant invention is produced in the following manner:

1. The surface 20 of mold 10 is coated with any suitable parting agent or separating film;
2. The pellets 24 are placed into the indentations 22 in surface 20 of the female section 12 until the desired amount of pellets 24 are in place;
3. The premixed foam 32 is evenly distributed between the rows of pellets 24;
4. The male section 14 of mold 10 is securely fastened to the female section 12 before the foaming action starts and is allowed to remain in place for the required curing period; and
5. The encapsulated pellets or molded pellet mat 28 is removed after a predetermined period of time and the "flash" around the edges of the pellet mat 28 is trimmed off.

The pellets 24 can now be easily inserted into the annular igniter cavity 16 of igniter 18 since they are in the form of a molded pellet mat 28 which is capable of being easily handled.

Although the invention has been described with references to a particular embodiment, it will be understood to those skilled in the art that the invention is capable of a variety of alternative embodiments such as the molded pellet mat being of any other suitable configuration within the spirit and scope of the appended claims.

We claim:

1. A molded pellet mat comprising a mat molded of a polyurethane mix, said mat having a cross section equivalent to half the cross section of an annular igniter cavity and a plurality of pyrotechnic pellets embedded in a prearranged pattern within said mat whereby a pair of said molded pellet mats can be utilized as an igniter charge.

* * * * *